United States Patent
Bocek et al.

(10) Patent No.: US 9,293,755 B2
(45) Date of Patent: Mar. 22, 2016

(54) INTELLIGENT BATTERY PACK MODULE

(75) Inventors: Peter Bocek, Seattle, WA (US); David Edwards-Zoars, Seattle, WA (US)

(73) Assignee: Battery Street Energy, Inc., Seattle, WA (US)

( * ) Notice: Subject to any disclaimer, the term of this patent is extended or adjusted under 35 U.S.C. 154(b) by 220 days.

(21) Appl. No.: 13/618,721

(22) Filed: Sep. 14, 2012

(65) Prior Publication Data

US 2013/0252033 A1 Sep. 26, 2013

Related U.S. Application Data

(60) Provisional application No. 61/534,610, filed on Sep. 14, 2011.

(51) Int. Cl.
*H01M 2/20* (2006.01)
*H01M 2/22* (2006.01)
*H01M 2/04* (2006.01)
*H01M 2/10* (2006.01)
*H01M 10/42* (2006.01)

(52) U.S. Cl.
CPC .............. *H01M 2/204* (2013.01); *H01M 2/043* (2013.01); *H01M 2/0404* (2013.01); *H01M 2/0434* (2013.01); *H01M 2/1005* (2013.01); *H01M 2/206* (2013.01); *H01M 10/425* (2013.01); *Y10T 29/49108* (2015.01)

(58) Field of Classification Search
CPC ......... H01M 2/20; H01M 2/04; H01M 10/00; H01M 10/02; H02J 7/00
See application file for complete search history.

(56) References Cited

U.S. PATENT DOCUMENTS

| | | | |
|---|---|---|---|
| 6,177,211 B1 * | 1/2001 | Lawrence | 429/187 |
| 2007/0019453 A1 * | 1/2007 | Pierce | 363/107 |
| 2008/0113262 A1 * | 5/2008 | Phillips et al. | 429/149 |
| 2008/0213652 A1 * | 9/2008 | Scheucher | 429/62 |
| 2009/0123814 A1 * | 5/2009 | Cabot et al. | 429/50 |
| 2010/0291418 A1 * | 11/2010 | Zhou et al. | 429/50 |

* cited by examiner

*Primary Examiner* — Kenneth Douyette
(74) *Attorney, Agent, or Firm* — Seed IP Law Group PLLC

(57) ABSTRACT

Apparatus and associated methods provide an intelligent battery pack interface module for mounting to an electrochemical cell assembly and having circuitry for establishing electrical connection with the cells. The circuitry may establish electrical connection in a parallel or series manner, for example. In an illustrative example, the circuitry may provide control and management operational functions. In some examples, the module may include a base and cover which cooperate to form a housing, where the base may include an alignment structure for alignment with cell terminals. In some examples, the circuitry may be located within the housing. Various examples may include handles extending from the module. In some examples, the handles may automatically retract upon release. The handles may retract to present a low profile so as not to interfere with connection of the module to a cable received in a plane substantially perpendicular to a gravity vector, for example.

13 Claims, 14 Drawing Sheets

INTELLIGENT BATTERY PACK MODULE

CROSS-REFERENCE TO RELATED APPLICATIONS

I hereby claim benefit under Title 35, United States Code, Section 119(e) of U.S. provisional patent application Ser. No. 61/534,610 filed Sep. 14, 2011, the entire contents of which are hereby incorporated by reference into this application.

TECHNICAL FIELD

Various embodiments relate generally to apparatus and methods for managing the operation of battery cells.

BACKGROUND

An electrical battery includes one or more electrochemical cells that convert stored chemical energy into electrical energy. Batteries have become a common power source for many household and industrial applications. There are two types of batteries: primary batteries and secondary batteries. Primary batteries are disposable batteries designed to be used once and discarded. Secondary batteries are rechargeable batteries designed to be recharged and used multiple times. Batteries come in many sizes. They range from miniature cells used to power hearing aids and wristwatches to battery banks that are the size of rooms that provide standby power for telephone exchanges and computer data centers.

SUMMARY

Apparatus and associated methods provide an intelligent battery pack interface module for mounting to an electrochemical cell assembly and having circuitry for establishing electrical connection with the cells. The circuitry may establish electrical connection in a parallel or series manner, for example. In an illustrative example, the circuitry may provide control and management operational functions. In some examples, the module may include a base and cover which cooperate to form a housing, where the base may include an alignment structure for alignment with cell terminals. In some examples, the circuitry may be located within the housing. Various examples may include handles extending from the module. In some examples, the handles may automatically retract upon release. The handles may retract to present a low profile so as not to interfere with connection of the module to a cable received in a plane substantially perpendicular to a gravity vector, for example.

Various embodiments may achieve one or more advantages. For example, self-retracting handles may be helpful in providing a gripping surface on a flexible extension member that has sufficiently elasticity to allow movement of the intelligent battery pack module in swift swinging movements. Retractable handles may provide substantially unimpeded horizontal-plane access, for example, to power and auxiliary ports for data, status, control, and/or charging signals, while the battery pack is installed in a rack or on a shelf. In some embodiments, the handles may be fixed relative the module to provide a location in which multiple cell assemblies and battery modules may be stacked.

In some embodiments, the cover may include a raised portion for housing discrete electronic components or for making connections, for example, via an appropriate printed circuit board (PCB). Sidewalls of the raised portion may include one or more ports that accessible from a substantially horizontal plane to facilitate connections when multiple intelligent battery pack modules are stacked on top of one another. In some examples, the electronics for monitoring the battery cells may be incorporated into a battery pack monitor module to connect with a header through a battery pack monitor module port. In some examples, the battery circuitry may provide charging commands to the cell assembly. For example, the battery circuitry may dictate whether a fast or slow charge is proper. In some examples, the battery circuitry may indicate a weak battery among one or more of the electrochemical cells. In some embodiments, the interface module may be removed as necessary to replace or refurbish batteries.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, various examples of battery pack modules are briefly introduced with reference to FIGS. 1-3I. Second, with reference to FIGS. 4-7, the discussion turns illustrate exemplary discrete electrical components in conjuncture with the battery pack module. Next, with reference to FIG. 8, a carrying case for the intelligent battery pack module is illustrated. Finally, with reference to FIG. 9, an exemplary in-use view of the intelligent battery pack module is shown.

Figure 1:
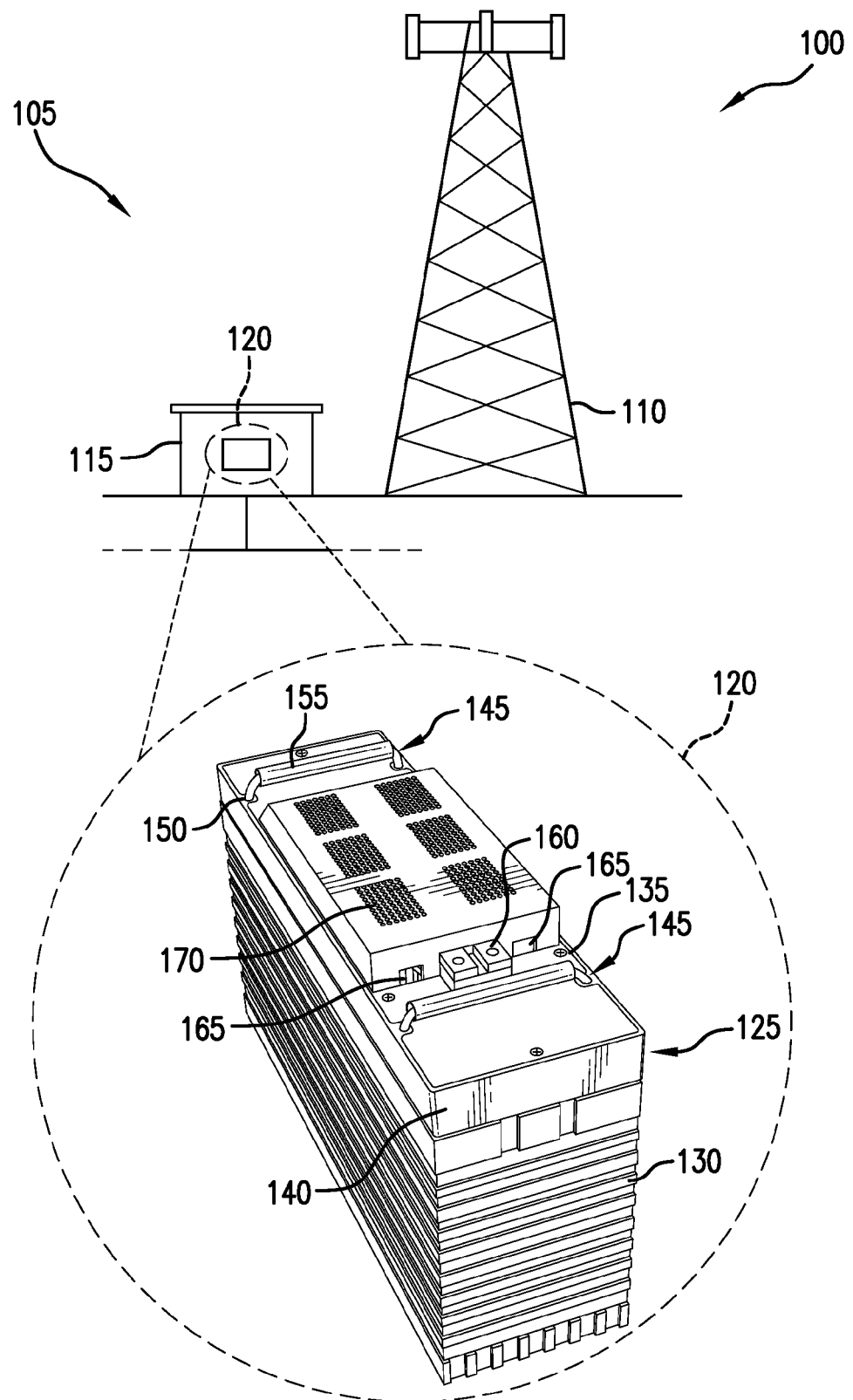
FIG. 1 shows an exemplary system including an exemplary intelligent battery pack module used with a telecommunications network site, where the battery pack module has retractable handles.

FIG. 1 shows an exemplary system including an exemplary intelligent battery pack module used with a telecommunications network site, where the battery pack module has retractable handles. The exemplary system 100 includes a telecommunications network site 105 with an antenna 110 and a base station 115. The base station 115 includes an intelligent battery pack module 120 as a source of reserve power in the event of disruption in a primary electric power source (e.g., AC utility mains). The intelligent battery pack module 120 includes a battery pack interface module 125 configured for mounting on a battery cell assembly 130. In the depicted example, the battery cell assembly 130 includes seven battery cells. The cells may be, for example, rechargeable lithium ion (e.g., lithium iron phosphate (LiFePO4)) cells. In some embodiments, cell chemistries may include, by way of example and not limitation, lithium titanate ($Li_4Ti_5O_{12}$), lithium cobalt oxide (LiCoO2), and/or lithium manganese (LiMn2O4). One or more bands and/or shrink wrap may hold the cells together in a block, which may be referred to herein as a battery cell assembly 130.

The battery pack interface module 125 includes a cover 135 and a base 140 that cooperates to form a housing that receives the circuitry for electrically interconnecting the battery cells of the battery cell assembly 130. In the depicted example, the base 140 is in the form of a tray, and the cover 135 may rest on top of the upper surfaces of the sidewalls of the tray. The circuitry may, for example, make operative connections among terminals of the batteries in the battery cell assembly 130. Such interconnection circuitry may, in some embodiments, be in the form of discrete electronic components connected by individual discrete wires. In some embodiments, such interconnection circuitry may be integrally formed as a printed circuit board (PCB) in which the electronic components are soldered to the interconnections that have been photo-lithographed onto a laminated substrate. In the depicted example, the cover 35 includes an integrally formed raised portion for housing external devices that may be connected to and extend from a PCB. External devices may include a battery pack monitor module that includes sensing components for managing the operation and function of the battery cell assembly 130. By way of example and not limitation, examples of external devices may include a USB memory stick, mobile (smart) phone, and/or wired or wireless tablet computer. Various embodiment may include interfaces for communications and protocols that may involve, for example, PCMCIA-like cards or similar plug in special function cards, RS232, USB, and/or wireless (e.g., Bluetooth), for example.

In the depicted example, the battery cover 125 includes a pair of handles 145 positioned within the footprint of the battery cell assembly 130. The handles 145 may attach with the base 140, and the cover 135 may have openings through which the handles 145 may extend out of the housing when the cover 135 cooperates with the base 140. Each of the handles 145 includes a flexible extension member 150 which, in some examples, may be under tension when fully retracted and a handgrip 155. The handgrip 155 is a tubular structure disposed around the flexible extension member 150. The handles 145 may be self-retracting from an extended length to its original position against the surface of the cover 135. The handgrip 155 may be made of a material with a suitable gripping surface for the hand, such as plastic. The flexible extension member 150 may be made of a material with suitable elasticity, resiliency, and memory qualities so it has the ability to return substantially to the original length after being stretched. Such materials may include a shock absorbing cord, such as a bungee cord, for example.

To implement the cord handle, some embodiments may be formed by heat treating or melding a cut end of the cord, for example, which may advantageously reduce fraying and/or enhance workability for use with either a knotted or mechanical clamp as a method for attachment to the base. The holes on the underside of the base 140 are larger than the cord diameter to allow the cord end (either knotted or mechanical clamp) to recess flush to the bottom of the base 140. In various embodiments, the cord may be securely attached to the base 140, for example, by providing a knot in the cord, a mechanical clamp on the cord, glue, or a combination of these or similar fastening techniques.

In some implementations of the handling a battery module 120, such as that of the depicted example, a single operator may grasp each of the handgrips 155 into each of his hands. When the operator grabs the handgrips 155 to move the battery module 120 into a first position, the flexible extension member 150 may stretch based on the force according to the mass and acceleration (including gravity) applied to the battery module 120. When the flexible extension member 150 is stretched to the point of becoming sufficiently taut, the operator can reposition the battery module 120 to a desired second position. When the operator releases the handgrips 155, the handles 145 may self-retract to their original length. The original length of the handles 145 may be the length at which the handles 145 allow for easy stacking and/or access to one or more ports 160, 165.

In some examples, where a first intelligent battery pack module 120 is stacked on a second intelligent battery pack module 120, the second intelligent battery pack module's 120 handles 145 may be sufficiently low profile with respect to the ports 160, 165 so as not to interfere with their connection to cables received in a plane substantially perpendicular to a gravity vector, or, for example, substantially parallel to a plane in which a top surface of the cover 135 lies. The handles 145 of the second intelligent battery pack module 120 may be at a height less than the height of its corresponding ports 160, 165. The first intelligent battery pack module 120 can be supported by the top surface of the battery pack interface module 125 of the second intelligent battery pack module 120.

In some embodiments, the handles 145 may rest on the surface of the battery pack interface module's cover 135. In some examples, the surface of the battery pack interface modules cover 135 may include a horizontal groove to receive at least a portion of the handle 145, including the grip 155, at a reduced height profile. This may advantageously provide additional clearance for cabling to connect to the ports 160, 165. The handles 145 may be positioned in a plane that is substantially parallel to the sidewall that includes the ports 160, 165 are located.

In the depicted example, one of the edges that form the walls of the raised portion includes the power port 160 and two data interface ports 165 for connection with an external device, such as the battery pack monitor module. The sidewall with ports 160, 165 may be oriented substantially perpendicular to the top surface of the cover 135 (e.g., top surface of the raised portion), whereas the opposing edge may be at a non-perpendicular angle relative to the top surface of the cover 135. The ports 160, 165 are positioned on an edge such that connectors (e.g., jacks, plugs, pins, sockets) may be inserted along a substantially horizontal plane, which may be substantially parallel to the top surface of the battery pack interface module 125. The ports 160, 165 are strategically positioned to allow convenient connection of the connectors even when a plurality of intelligent battery pack modules are stacked on or alongside of each other, such as in a closet, cabinet, or rack.

In the depicted example, the top surface of the raised portion includes aperture vents 170 that are distributed across six sections of seven rows. The vents 170 may permit air circulation to and from the intelligent battery pack module 120. In some circumstances, the vents 170 may prevent overheating of the intelligent battery pack module 120, especially the circuitry housed within the cover 135.

Figure 2:
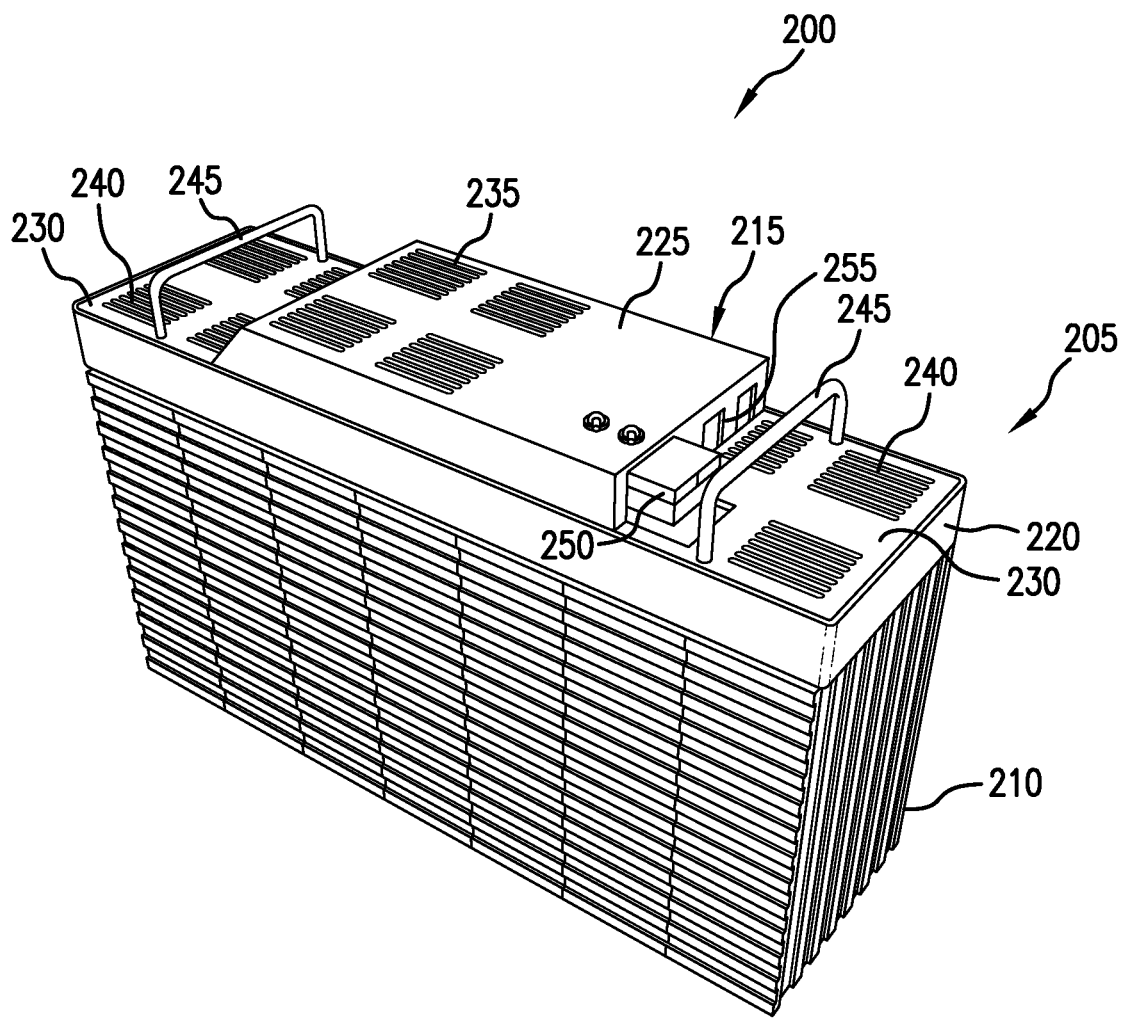
FIG. 2 shows an exemplary intelligent battery pack module having fixed handles.

FIG. 2 shows an exemplary intelligent battery pack module having fixed handles. An intelligent battery pack module 200 includes a battery pack interface module 205 and cell assembly 210. The battery pack interface 205 and cell assembly 210 include similar components as shown and described in reference to FIG. 1. As such, the battery pack interface 205 includes a cover 215 and a base 220 that cooperate to form a housing. In various examples, the cover 215 may be transparent or opaque. The cover 215 includes a raised portion 225 and non raised portions 230, the raised portion 225 has vents 235 to allow air circulation of the circuitry and the non raised portions 230 has vents 240 also to allow air circulation of the circuitry.

The battery pack module 200 includes handles 245 extending from the base 220 and through the cover 215. The handles 245 in FIG. 2 may be fixed and rigid in construction. The handles 245 may be of fixed height relative to a top surface of the cover 215. In some other examples, the rigid handles 245 may be configured to drop vertically to a reduced height profile when not in use. In some other examples, the rigid handles 245 may be hinged (not shown) so that the handles 245 may be rotated into a stowed position, lying in a substantially horizontal plane.

In the depicted example, the handles 245 may be at the same or higher height than the top surface of the raised portion of cover 215. This may create an unobstructed access along a horizontal plane into a port 250 and/or 255. Similar to FIG. 1, the battery pack interface 205 may include multiple access or power ports. The height of the handles 245 may be at the same height as the top surface of the raised portion of cover 225 so another intelligent battery pack module 200 can be stacked such that its battery cell assembly 210 rests on the top surface of a raised portion 225 of the cover 220.

In some examples, a bottom surface of the battery pack interface module 205 may lie in a plane that is tangent to an upper most portion of the handles 245. If the height of the handles 245 is higher than the top surface of the raised portion 225 of cover 215, another intelligent battery pack module 200 can be stacked such that its battery cell assembly 210 rests on the handles 245, or the handles may be wedged between the battery cells. To afford stacking of an intelligent battery pack module 200 on the handles 245 or wedging of the handles 245 between the battery cells, the handles 245 may be made of a material of sufficient strength, such as a metal or rigid plastic. In the depicted example, the raised portion 225 may be formed separately as a cap that sits on the cover 215 to form the raised portion 225 of the cover 215.

Figure 3A:
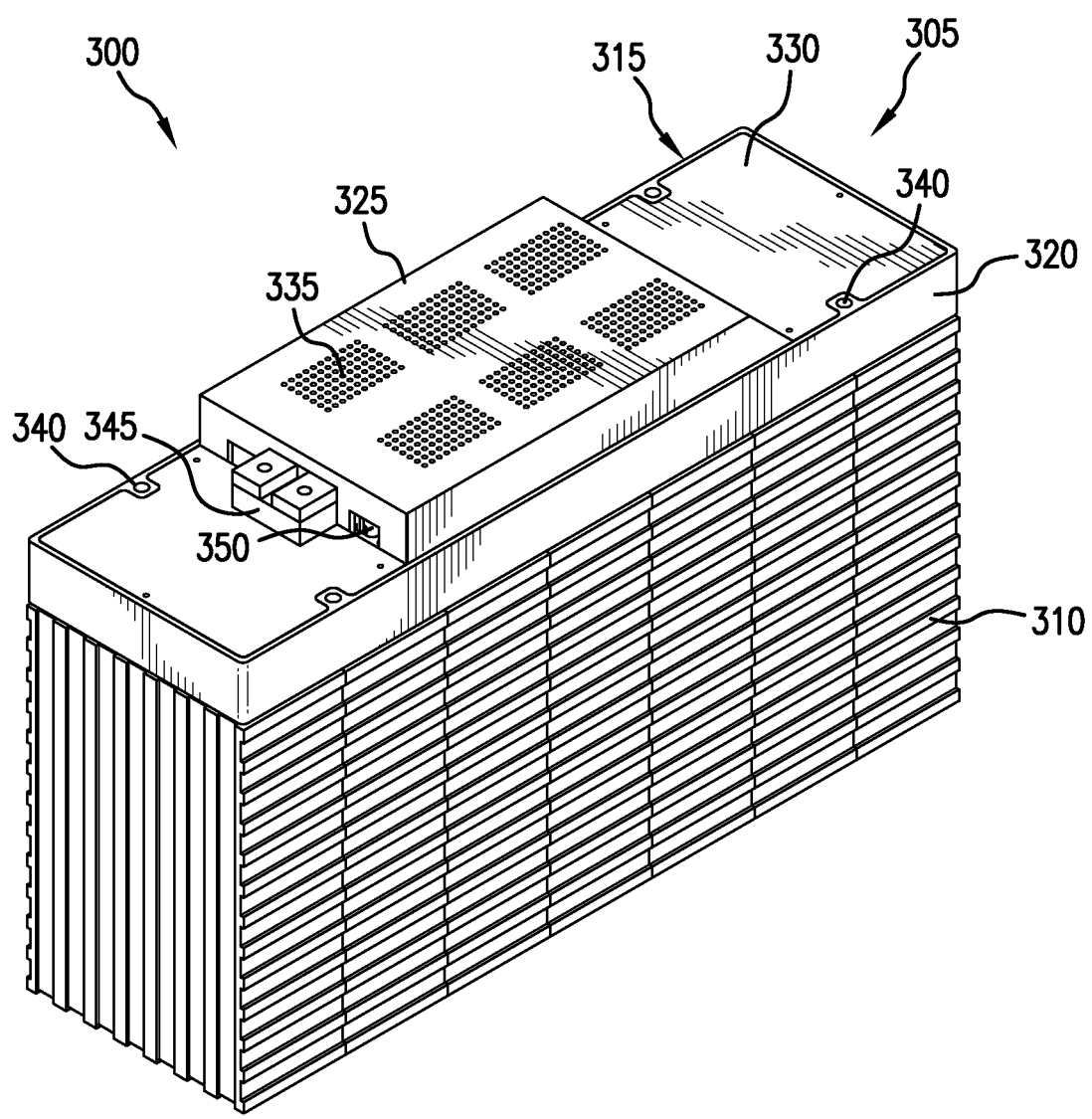
FIG. 3A shows an upper perspective view of an exemplary intelligent battery pack module.

FIG. 3A shows an upper perspective view of an exemplary intelligent battery pack module. The intelligent battery pack module 300 is shown with interface module 305 and battery cell assembly 310. The handles are removed to more clearly show an exemplary construction of the interface module 305. Similar to as previously described in reference to FIGS. 1 and 2. The interface module 305 includes a cover 315 and a base 320 which cooperate to form a housing. The cover 315 includes a raised portion 325 and a non raised portion 330, where at least the raised portion 325 has vents 335. Extending through the non raised portion 330 are apertures 340 for receiving the handles (not shown) and securing the handles within. In some examples, the apertures 340 may be threaded for threadably receiving the handles. In some examples, another opening below the apertures 340 may be threaded. In some examples, a nut or other fastener may be used to secure the handles below the aperture 340. Also shown are ports 345, 350 similar to as described in reference to FIGS. 1 and 2.

Figure 3B:
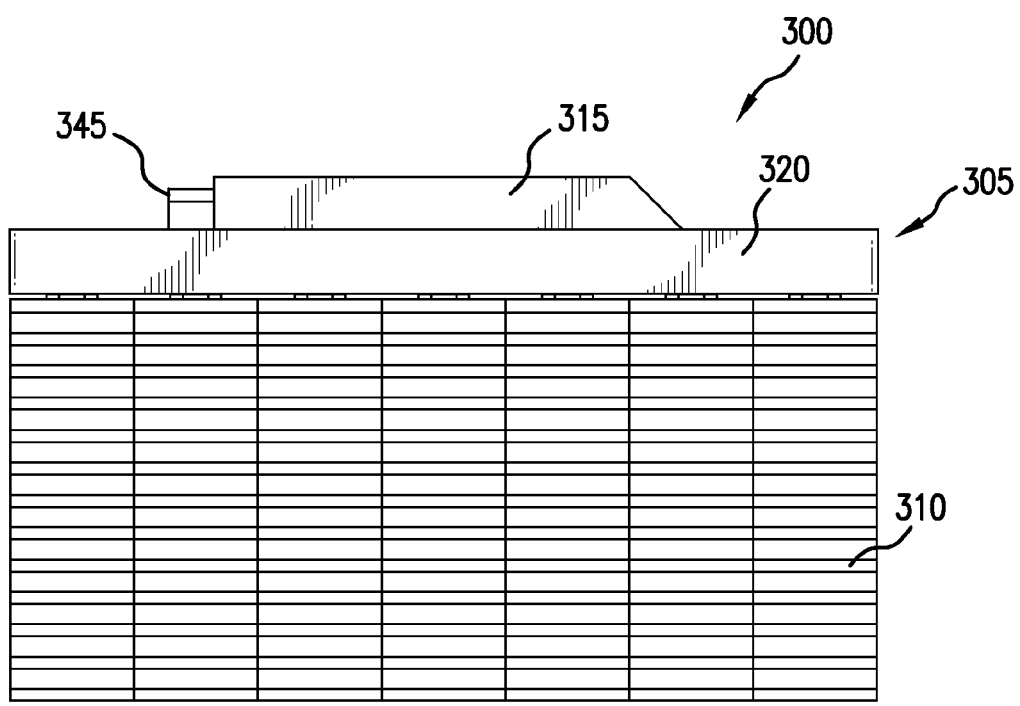
FIG. 3B shows a side view of the exemplary intelligent battery pack module as shown in FIG. 3A.

FIG. 3B shows a side view of the exemplary intelligent battery pack module as shown in FIG. 3A. As shown, the cover 315 extends above the base 320 and includes a slanted edge along the raised portion 325. The access port 345 is also positioned above the base 320 to permit access to the port 345 while the interface module 305 is attached to the cell assembly 310. As shown, the cover 315 and base 320 maintain a substantially low profile relative the cell assembly 310 and thus reduce an overall footprint of the battery pack module 300.

Figure 3C:
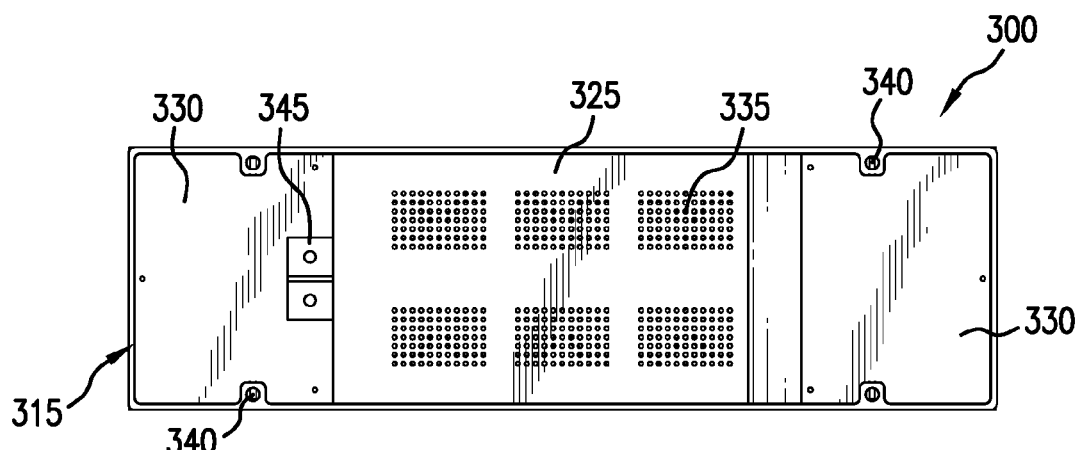
FIG. 3C shows a top view of the exemplary intelligent battery pack module as shown in FIG. 3A.

FIG. 3C shows a top view of the exemplary intelligent battery pack module as shown in FIG. 3A. As illustrated, the cover 315 employs a substantially rectangular shaped structure to follow an outside contour of the cell assembly 310 and thus reduce an overall footprint of the battery pack module 300.

Figure 3D:
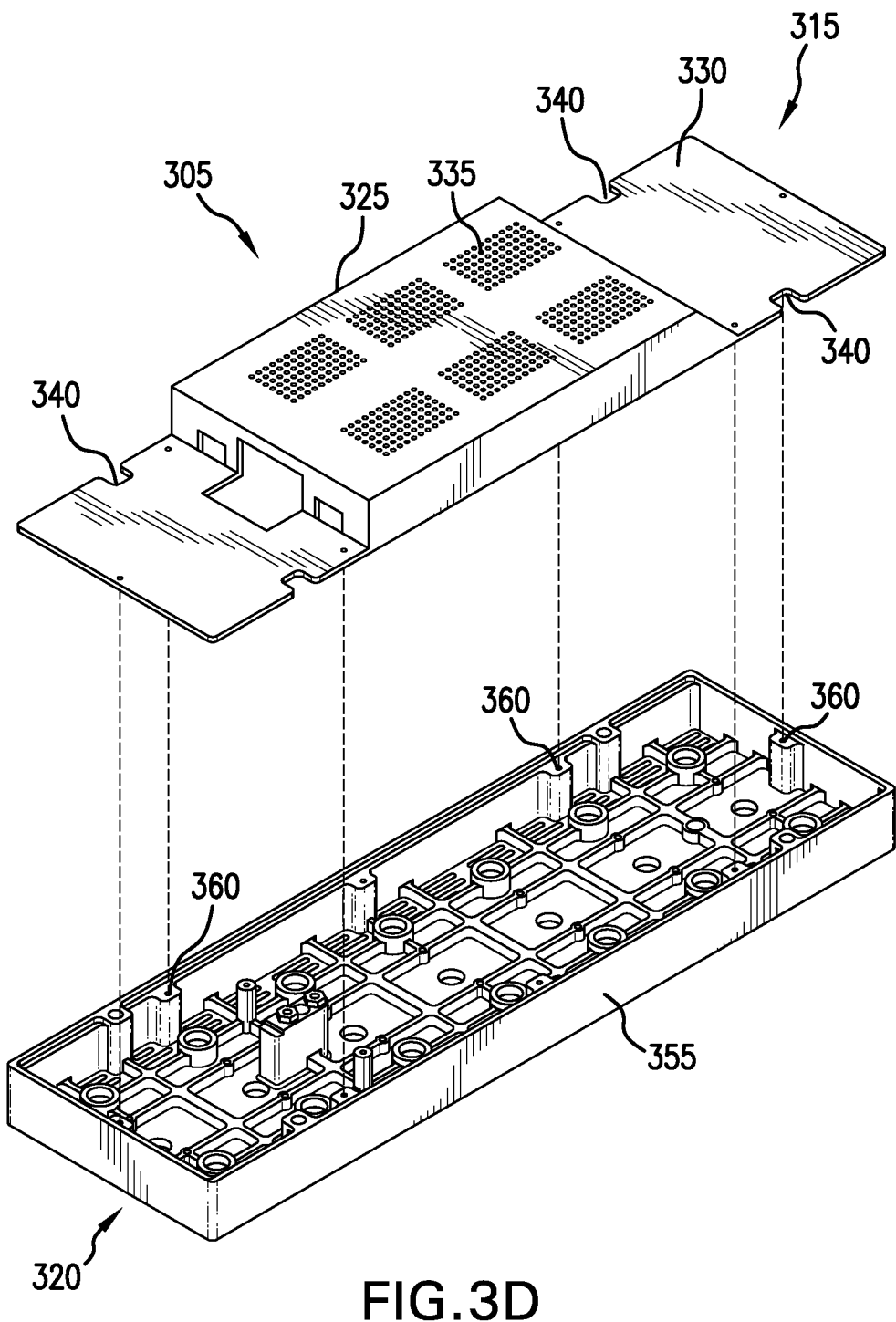
FIG. 3D shows an upper perspective view of the exemplary battery pack interface module as shown in FIG. 3A.

FIG. 3D shows an upper perspective view of the exemplary battery pack interface module as shown in FIG. 3A. The upper perspective view shows the notches or apertures 340 in opposing sides of each end flange or non raised portion 330 of the cover 315. The notches 340 may receive a vertical portion of a handle, such as the handle shown in FIGS. 1 and 2. The base 320 is shown with sidewalls 355 which cooperate with the outer perimeter edge of the cover 315 and define a space between the cover 315 and the base 320 for housing the internal battery circuitry. Also shown are apertures 360 within the base 320 for aligning with apertures 340 of the cover 315 for the handles and with apertures for fasteners for affixing the cover 315 to the base 320.

Figure 3E:
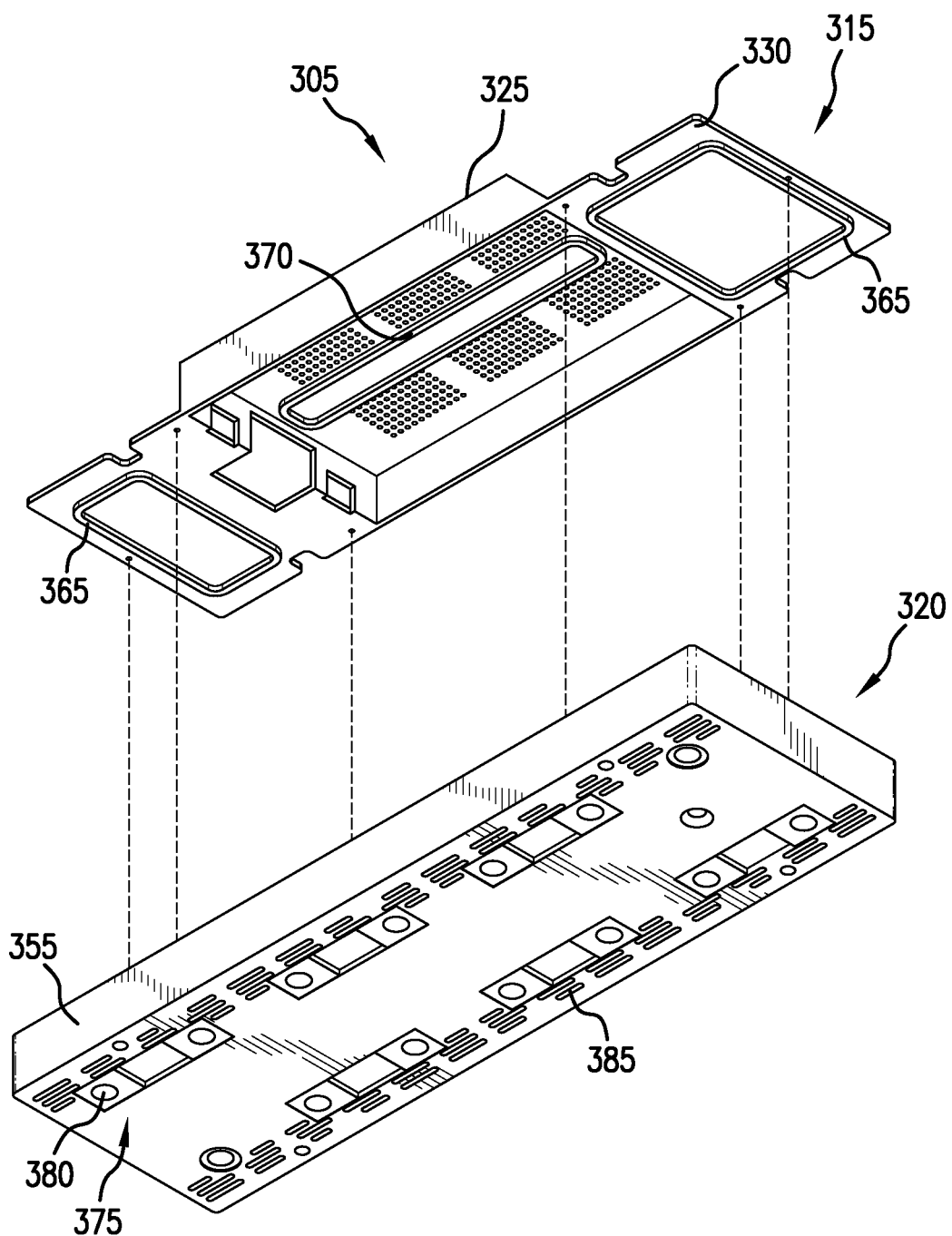
FIG. 3E shows a lower perspective view of the exemplary battery pack interface module as shown in FIG. 3A.

FIG. 3E shows a lower perspective view of the exemplary battery pack interface module as shown in FIG. 3A. The lower perspective view of the exemplary battery pack interface module 305 shows stiffening members 365 on a bottom surface of the opposing flanges 330 of the cover 315, and a stiffening member 370 on a bottom surface of the raised portion 325 of the cover 315. One or more stiffeners may substantially increase the stiffness or rigidity of the opposing flanges on the cover 315 so that the assembled battery pack interface module 305 can support the weights of the cell assembly 310 when lifted by the handles (not shown). In some embodiments, the stiffening members 365, 370 may cooperate with the base 320 to prevent sliding of the cover 315 from the base 320.

On the bottom surface of the base 320 is an alignment structure 375 for aligning the terminals of the cell assembly 310. When installed, apertures 380 of the alignment structure 375 on the base 320 may register with each of the terminals of the electrochemical cells. Rapid attachment of the base 320 to terminals of each cell in the battery assembly 310 may be achieved, for example, with a power tool (e.g., nut driver) that drives a fastener (e.g., bolt) into threaded terminals through the apertures 380 in the base 320. As such, assembly of the battery pack interface module 305 to the cell of the battery pack 310 may be accomplished with substantially reduced time, labor, and with reduced opportunity for assembly errors.

Figure 3F:
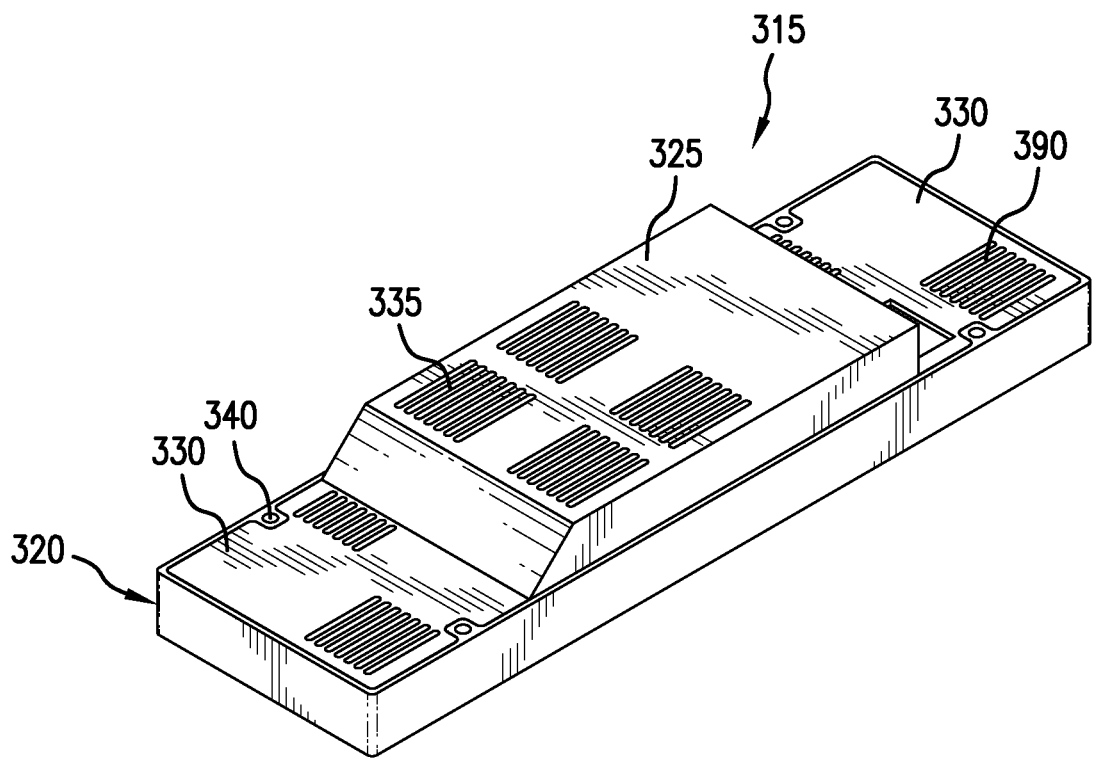
FIG. 3F shows a first side upper perspective view of an exemplary cover and base of the interface module.
Figure 3G:
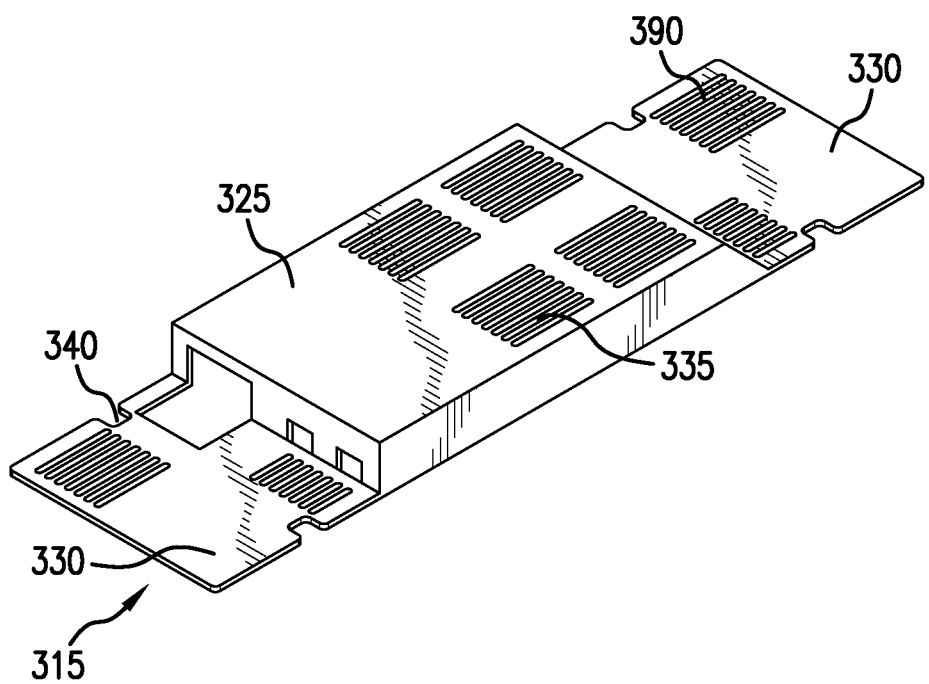
FIG. 3G shows a second side upper perspective view of an exemplary cover of the interface module.
Figure 3H:
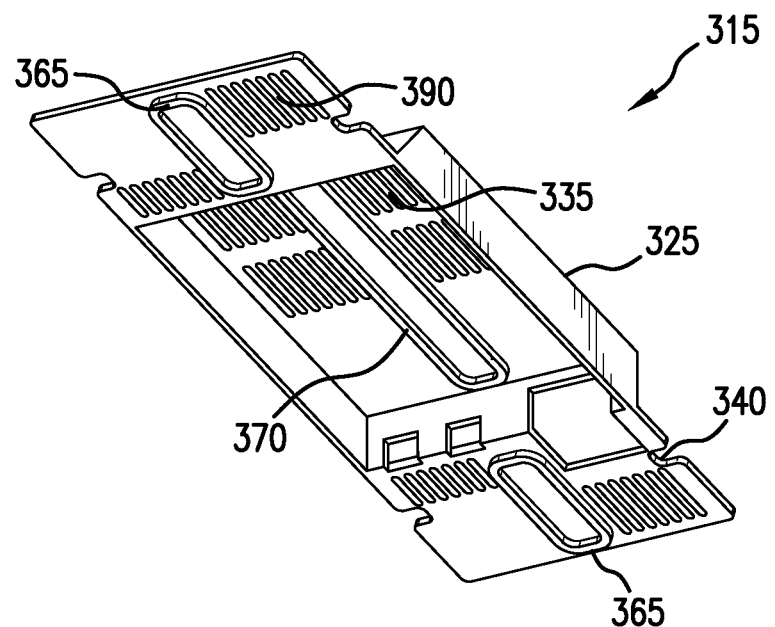
FIG. 3H shows a lower perspective view of an exemplary cover of the interface module.
Figure 3I:
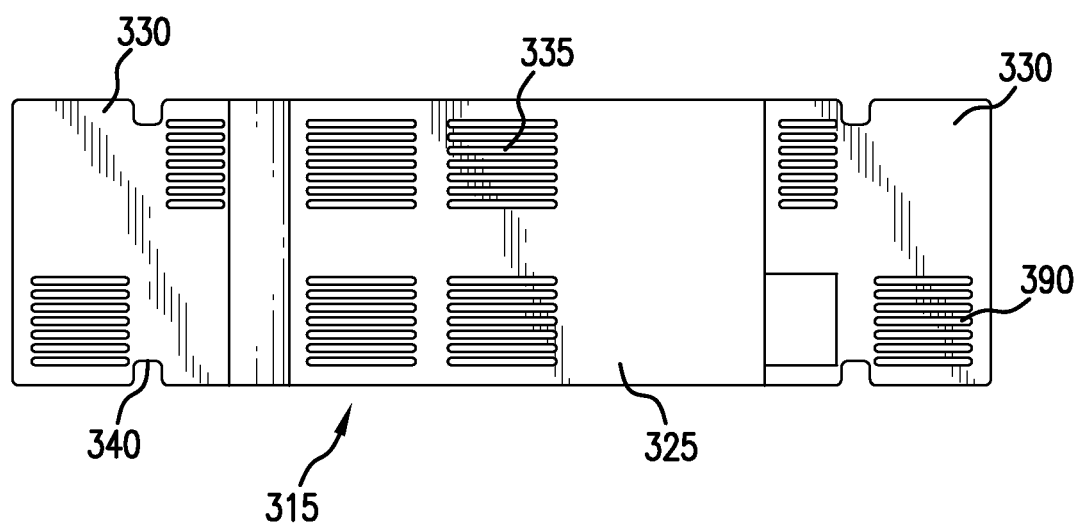
FIG. 3I shows a top view of the exemplary cover of an interface module.

FIG. 3F shows a first side upper perspective view of an exemplary cover and base of the interface module. FIG. 3G shows a second side upper perspective view of an exemplary cover of the interface module. FIG. 3H shows a lower perspective view of an exemplary cover of the interface module. FIG. 3I shows a top view of the exemplary cover of an interface module. As shown, the cover 315 maintains a low profile to minimize an overall size of the battery pack module 300. In an exemplary size of the cover 315, the cover 315 has a length of 1 foot-6.5 inches, a width of 5.28125 inches and a height of 2.5 inches. Also shown are exemplary vents 390 along the non raised portion or flange 330 of the cover 315.

Figure 4:
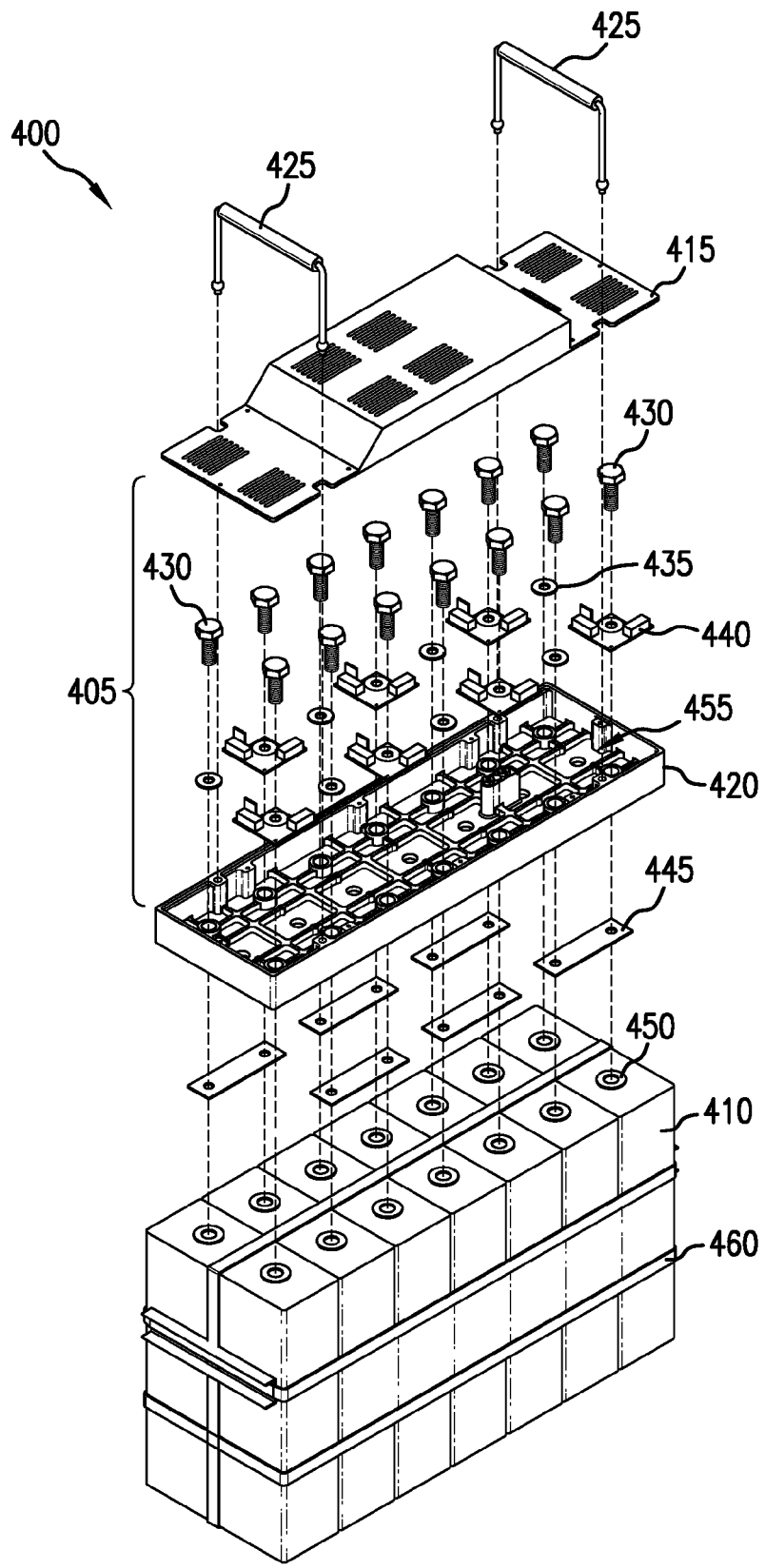
FIG. 4 shows an exploded upper perspective view of an exemplary intelligent battery pack module.

FIG. 4 shows an exploded upper perspective view of an exemplary intelligent battery pack module. An intelligent battery pack module 400 with circuitry implemented as discrete electronic components that can be housed within its battery pack interface module 405. The intelligent battery pack module 400 includes a battery cell assembly 410 similar to as described in reference to the previous FIGS. 1 and 2, with seven battery cells, each with a positive and a negative terminal, and the battery pack interface module 405 with a cover 415 and a base 420 that cooperate to form a housing for circuitry that electrically interconnects the battery cells of the battery cell assembly 410. In the depicted example, the cover 415 is in the form of a relatively flat plate with handles 425 (e.g., stretchable cords with plastic grips, rigid members) on opposing ends. The cover 415 includes vents in the form of two rows and seven columns of seven slits to permit air circulation above the battery pack 410 to promote cooling. In the depicted example, each section of slits is in substantial vertical registration with a battery cell terminal.

In the depicted example, the circuitry is shown as a number of discrete electronic components that are received within the housing formed by the cover 415 and the base 420. When assembled, the discrete electronic components electrically interconnect the battery cells of the battery cell assembly 410 by attaching to and/or penetrating through the surface of the base 420 that is opposite from the underside of the base 420 that contacts the battery cell assembly 410. In the depicted example, the discrete electronic components include bolts 430, shims 435, bus units 440, and jumpers 445 that connect with each of terminals 450 of the battery cells of the battery cell assembly 410. An alignment structure 455 is formed into the base 420 to align the circuitry and the terminals 450 of the battery cell assembly 310. In the depicted example, the alignment structure 450 comprises apertures extending through the bottom of the base 420.

Each of the jumpers 445 may be a single terminal connector that connects with a single terminal or a double terminal connector that connects with two terminals. In the depicted example, a single terminal connector has one eye, and a double terminal connector has two eyes connected with a bar. The double terminal connector may have one eye connecting with a terminal of a battery cell and the other eye connecting with another terminal of opposite polarity in another battery cell, such as an adjacent cell. The single terminal connector may connect with a single terminal that has not been connected with a connector. The bus unit 440 may be connected to each battery cell. In the depicted example, the bus unit 440 is depicted as "L"-shaped with an eye at the angle. The bus units 440 may each include a sensor that senses voltage, current, and/or provides functions such as, for example, load balancing, cell charge, and temperature of the battery cells. In the depicted example, the terminal bolts 430 are inserted through the eyes of the connectors 435 and/or the bus units 440 and through the jumpers 445 and into each of the terminals 450.

The jumpers 445, which are depicted as bars with holes, may electrically connect terminals of opposite polarity in nearby cells. When jumpers 445 are used, the connectors 435 may be used as described above or a single terminal connector is used with each terminal. When jumpers 445 are used, terminal bolts 430 are inserted into each hole of the jumpers 445. In some embodiments, the terminal bolts 430 may pass through silicone bronze shims 435, which may provide an advantageous combination of mechanical strength and electrical conductivity. The shims 435 may be received and held securely in enlarged holes in the base 40 via interference fit. In some embodiments, the discrete electronic components may be further connected with a number of wires.

Also depicted in the example is battery strapping 460 for securing multiple battery cells in a singular unit to form the cell assembly 410. The strapping 460 may secure the battery cells in a rectangular shape such as to match the shape of the interface module 405.

Figure 5:
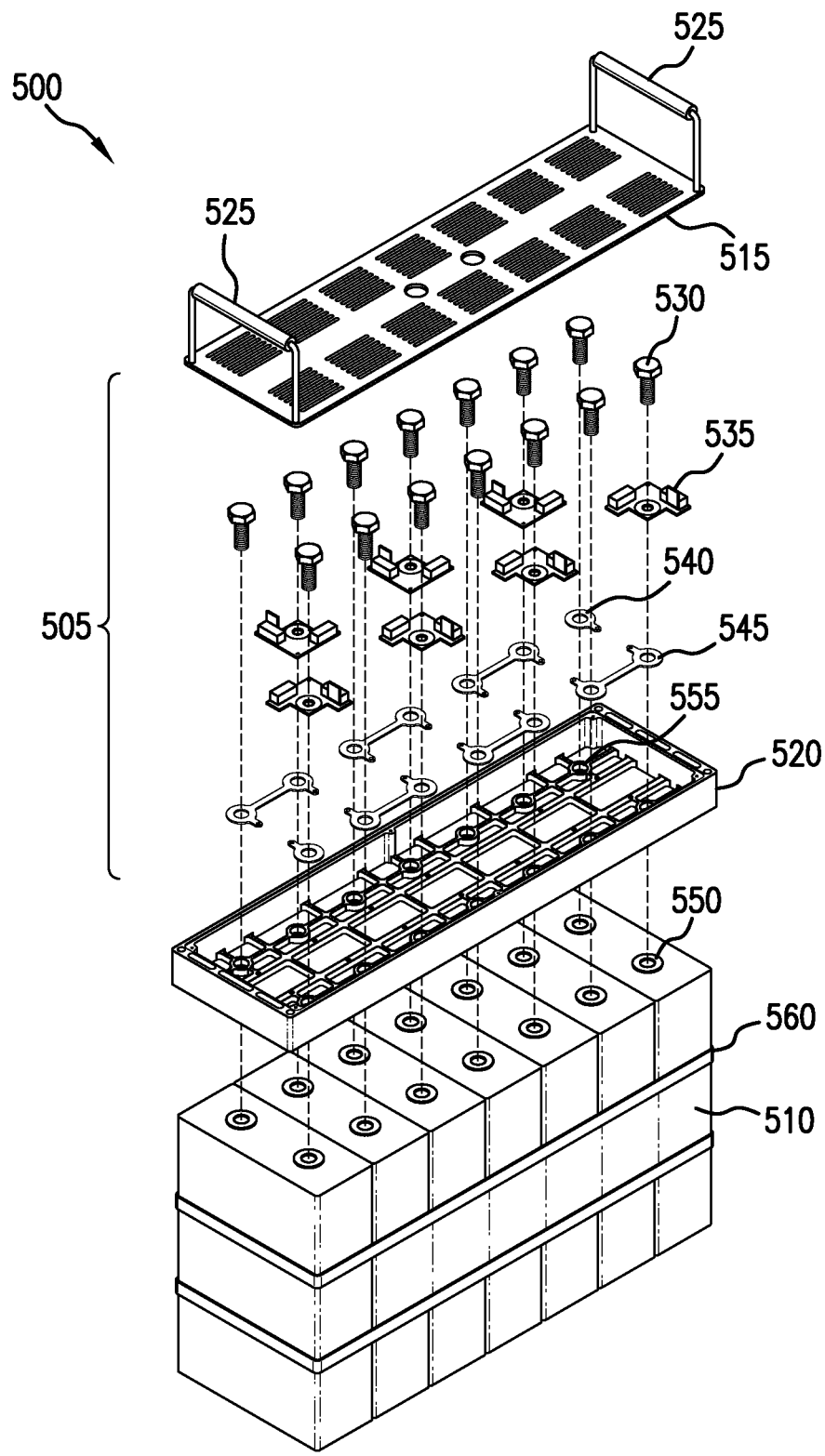
FIG. 5 shows an exploded upper perspective view of an exemplary intelligent battery pack module.

FIG. 5 shows an exploded upper perspective view of an exemplary intelligent battery pack module. An intelligent battery pack module 500 with a battery pack interface module 505 for covering a battery cell assembly 510 similar to as described in reference to the previous FIGS. 1 and 2. The battery pack interface module 505 includes a cover 515 and base 520. In the depicted example, the cover 515 is flat with four sections of seven slits aligned over the four battery cells. Handles 525 extend from opposing sides of the battery pack interface module.

In the depicted example, the discrete electronic components of the battery circuitry contained within the interface module 505 include terminal bolts 530, connectors 535 and bus units 540, 545 that connect with each of terminals 550 of the battery cells of the battery cell assembly 510. An alignment structure 555 is formed into the base 520 to align the circuitry and the terminals 550 of the battery cell assembly 510. In the depicted example, the alignment structure 550 comprises apertures extending through the bottom of the base 520. The battery cells of the cell assembly 510 are held together via strapping 560.

Figure 6:
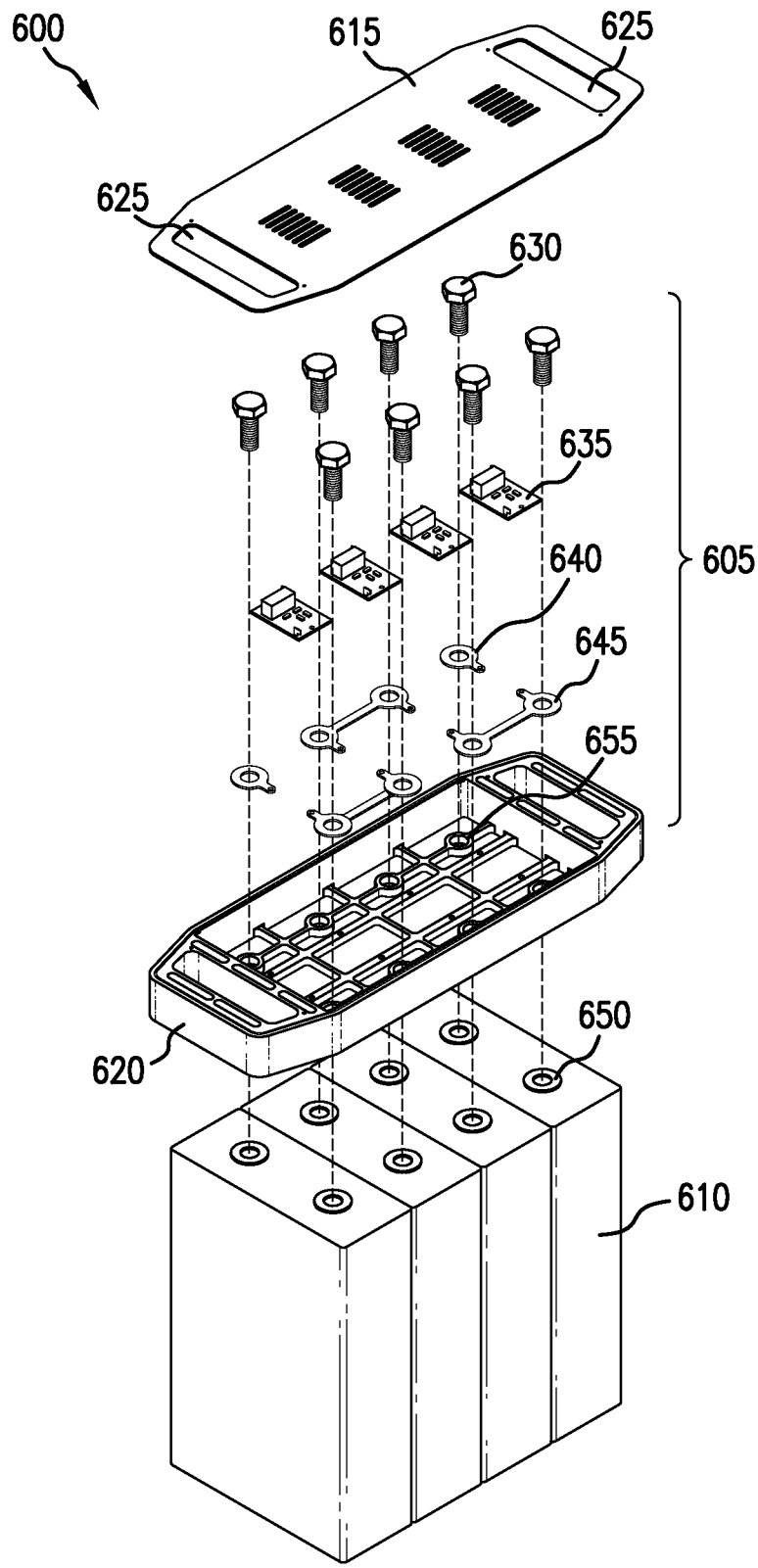
FIG. 6 shows an exploded upper perspective view of an exemplary intelligent battery pack module.

FIG. 6 shows an exploded upper perspective view of an exemplary intelligent battery pack module. An intelligent battery pack module 600 with a battery pack interface module 605 for covering a battery cell assembly 610 similar to as described in reference to the previous FIGS. 1 and 2. The battery pack interface module 605 includes a cover 615 and base 620. In the depicted example, the cover 615 is flat with four sections of seven slits aligned over the four battery cells. Handles 625 extend from opposing sides of the battery pack interface module 615 beyond the footprint of the battery cell assembly 610. The handles 625 may be formed integrally with the battery pack interface module 605 with openings cut in opposing sides of the battery pack interface module 605.

In the depicted example, the discrete electronic components of the battery circuitry contained within the interface module 605 include terminal bolts 630, connectors 635 and bus units 640, 645 that connect with each of terminals 660 of the battery cells of the battery cell assembly 610. In the depicted example, the bus unit 635 is a rectangular piece. An alignment structure 655 is formed into the base 620 to align the circuitry and the terminals 650 of the battery cell assembly 610. In the depicted example, the alignment structure 655 comprises apertures extending through the bottom of the base 620.

Figure 7:
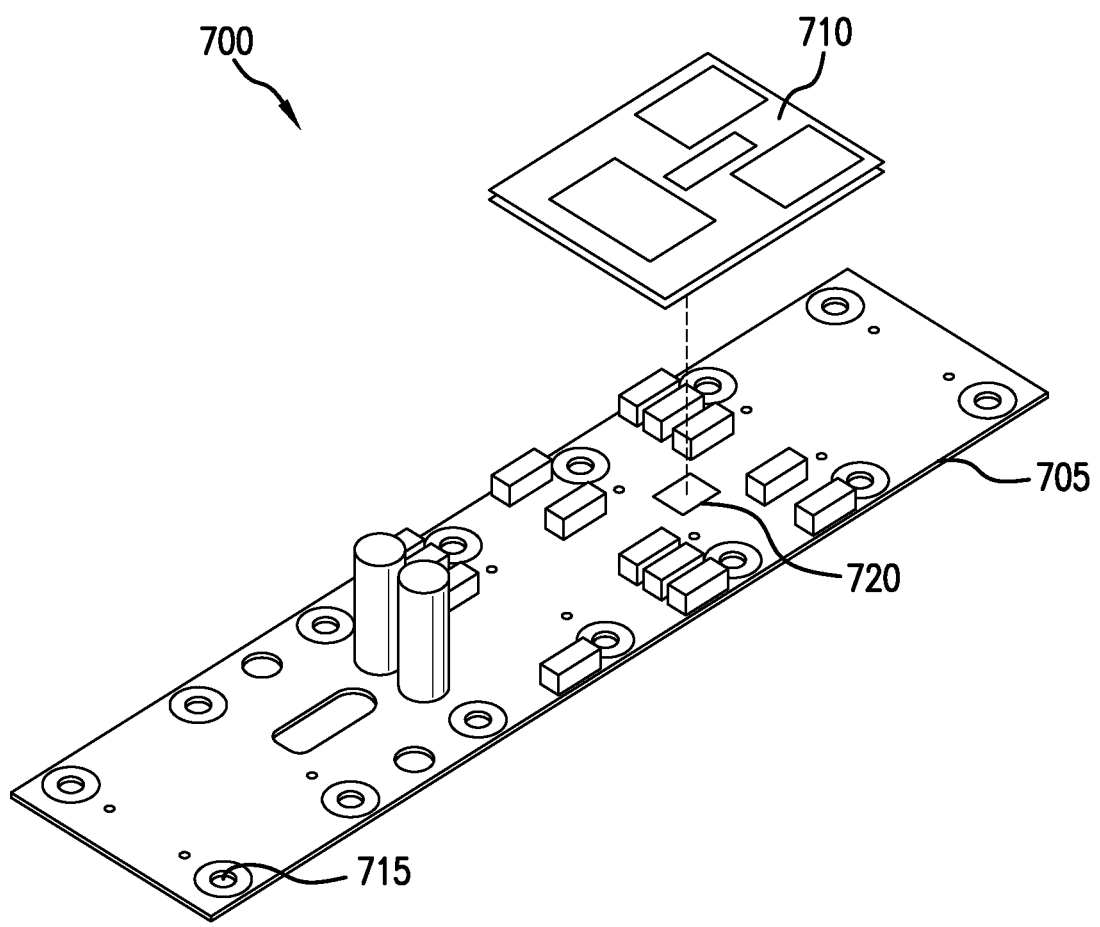
FIG. 7 shows an exploded upper perspective view of an exemplary battery circuitry being a PCB.

FIG. 7 shows an exploded upper perspective view of an exemplary battery circuitry being a PCB. A perspective view of an exemplary electronics module 700 suitable for the intelligent battery pack module as shown in reference to FIGS. 1 and 2. The electronics module 700 includes a battery interface module 705 and a battery monitory module 710 that may releasably couple to the battery interface module 705. In operation, the battery interface module 705 includes a number of conductive nodes 715 that make galvanic/electrical contact with one of the battery terminals. On a circuit board substrate (e.g., fiberglass) or PCB, conductive traces provide high current (e.g., wide traces) connections to carry the main battery current in series through each of the cells in the battery pack in between an input port (e.g., DC board to wire connector). The PCB depicted in the figure also includes signal traces that provide electrical connection, for example, from each of the high current nodes to an interface connector 720. In this example, the connector 720 may electrically couple the signals from the battery interface module 705 to the battery monitor module 710.

The battery monitor module 710 may include signal processing, filtering, amplification, sampling, storage circuits, for example. In some embodiments, the battery monitor module 710 may perform a variety of functions. For example, some embodiments may monitor node voltages in the battery pack using sample and hold or N:1 multiplexers to direct analog signals to an off-board sampling system. In some embodiments, the battery monitory module 710 may provide cell balance functionality, which may be useful, for example, with charging and or discharging operations. Some embodiments may cooperate with an external charging source to provide an electrical pathway for charging current through the connector 720. In some embodiments, a charging circuit and/or control circuit, or other analog or digital power supply, may be included. In some embodiments, the battery monitor module 710 may provide audible and/or visual alarms, such as when voltage one or more cells falls outside of a predetermined normal operation.

In some implementations, the battery monitor module 710 may be compatible, for example, with any of a number of different battery interface modules 705. The battery interface module 705 may be implemented (not shown) for different arrangements or numbers of cells. For example, a battery system with 4 cells may have a corresponding battery interface module sized and configured to connect and operate 4 cells. The 4 cell battery interface module may include the connector 720 that is compatible with the battery monitor module 710. As such, some implementations may provide a universal monitor functionality for a range of cell counts (e.g., 2, 3, 4, 5, 6, 7, 8, 9, 10, 11, 12, 13, ... at least 24) such that a single battery monitor module 710 design can be deployed for a wide range of battery pack sizes or applications.

Figure 8:
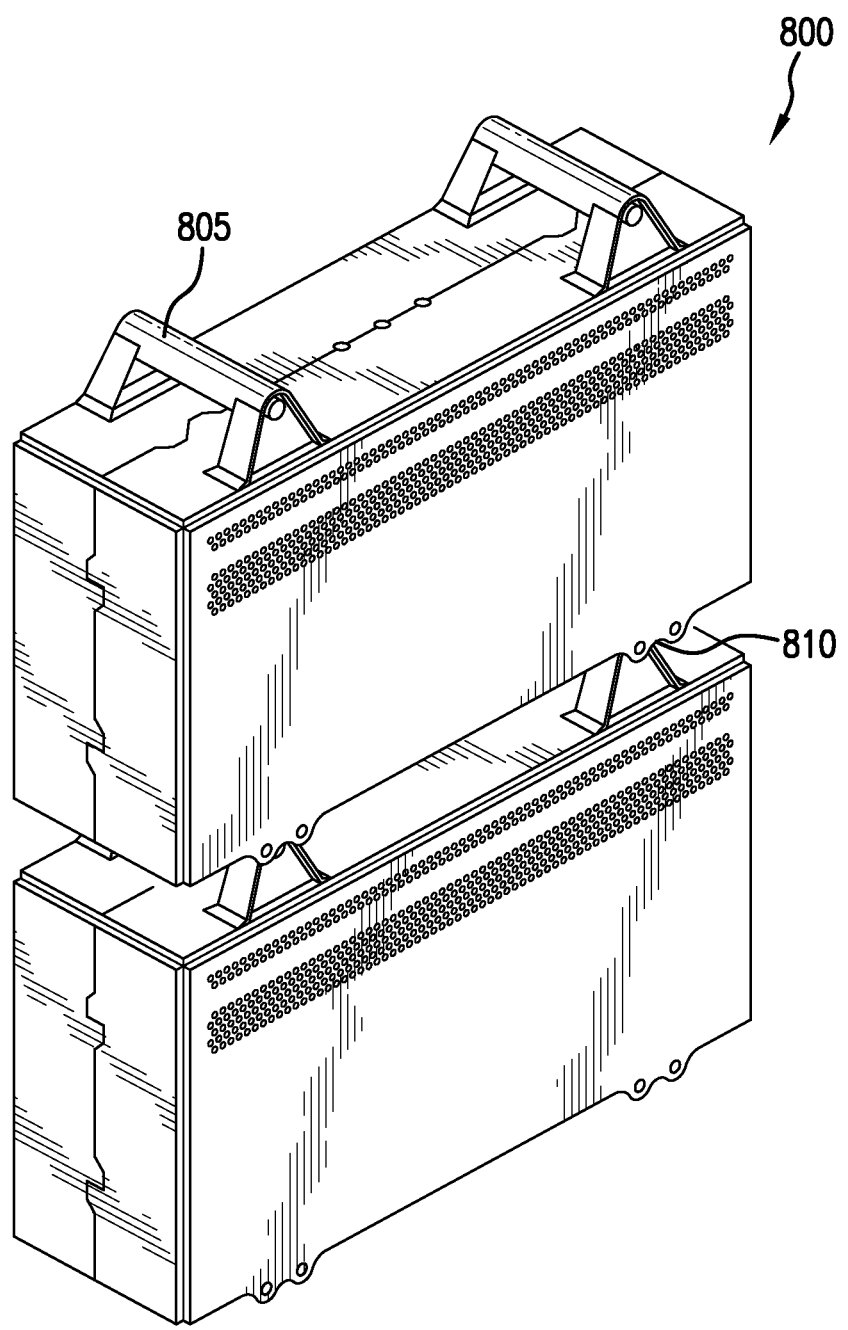
FIG. 8 shows exemplary clamshell cases for enclosing intelligent battery pack modules.

FIG. 8 shows exemplary clamshell cases for enclosing intelligent battery pack modules. One or more cases 800 may be openable to receive the intelligent battery pack module as shown in reference to FIGS. 1 and 2. The clamshell cases 800 may be adapted to house both the battery cell assembly and circuitry for interconnecting and operating the battery cells of the battery cell assembly. In an exemplary embodiment, the cases 800 may include handles 800 on one side and indentations 810 on an opposite side which cooperate to permit stacking of the cases 810 and thus stacking of intelligent battery pack modules.

Figure 9:
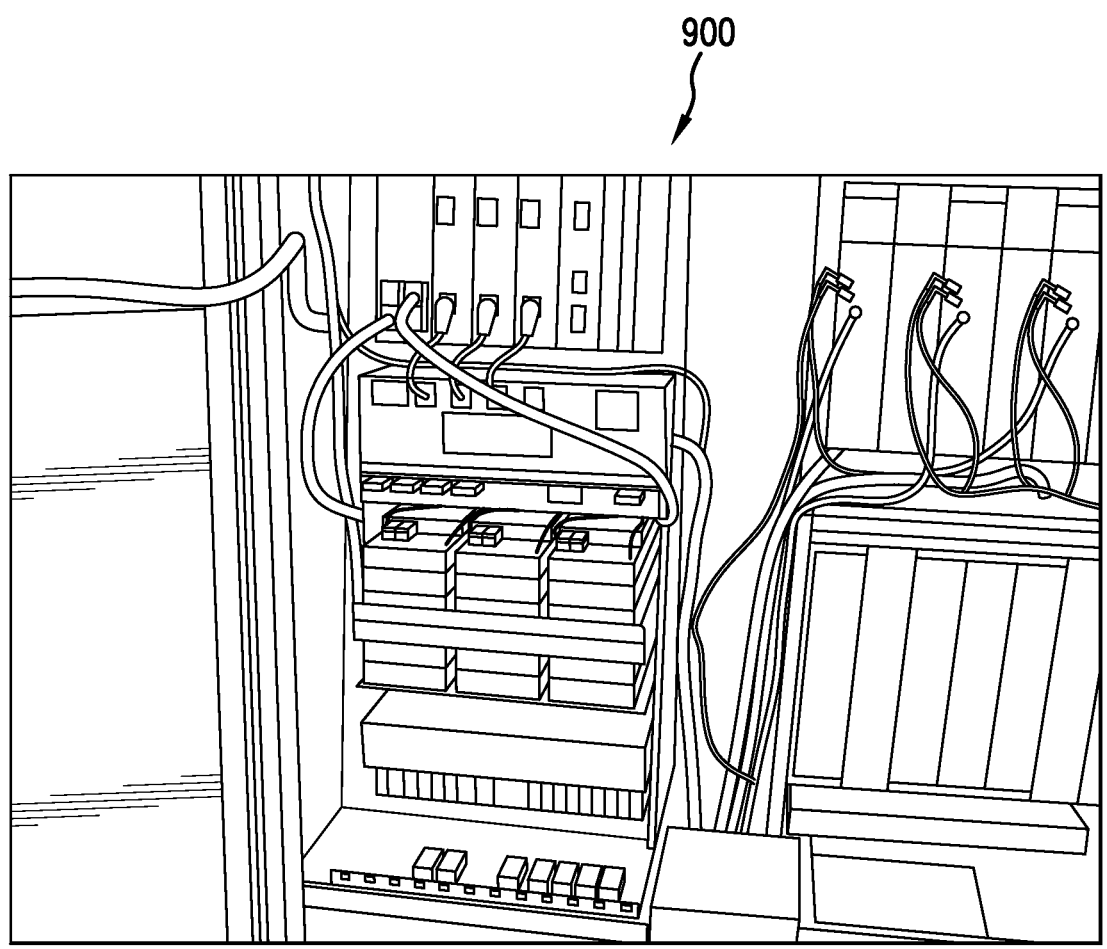
FIG. 9 shows a base station that includes three intelligent battery pack modules.

FIG. 9 shows a base station that includes three intelligent battery pack modules. A base station 900 includes controls and electronics suitable for being powered or powering the battery pack modules.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and m-ay be fixed or removable (e.g., hard disk, floppy disk, thumb drive, CD, DVD).

Some embodiments may package a plurality of rechargeable (e.g., lithium ion) cells into an intelligent battery pack module. In an illustrative example, a battery pack interface module is adapted for cooperating with a battery cell assembly of rechargeable lithium ion battery cells. The battery pack interface module may be configured for efficiently and convenient assembly and/or field deployment of the battery pack. The battery pack interface module may include a cover and a base that cooperate to form a housing for containing circuitry that electrically interconnects the battery cells. In some examples, the circuitry may be discrete components attached to the inside of the base and vertically aligned with the battery cells. In some examples, the circuitry may be a printed circuit board (PCB) where discrete components are attached to wire traces photolithographed into a laminated substrate. The discrete components may include connectors, jumpers, or sensors. In some examples, the circuit board includes a header for attaching with a battery pack monitor module that incorporates the sensors that might otherwise be discrete components positioned on the base or circuit board. The sensors may include voltage, current, temperature, or load balancing sensors. In some examples, handles may be attached to the battery pack interface module to facilitate movement of the intelligent battery pack module. The handle may be fixed or self-retracting. The battery pack interface module may include ports on the cover for power input and connection of a battery pack monitor module with the header within the housing. The ports and the handles may be strategically positioned to provide easy access to the ports. The handles may be strategically positioned to allow stacking of intelligent battery pack modules. In some examples, the battery pack interface module contains both the circuitry and battery cell assembly, and the bottom of the battery pack interface module has indentations to afford stacking on handles.

FIGS. 1 and 2 depict seven-cell battery assemblies. The use of seven-cell battery assemblies is believed to enables a substantially more efficient use of the capacity of the battery cells in the volume of space available in a standard shelf at a network site, such as the site 105 of FIG. 1. At seven cells, 96% of the capacity can be effectively used. In an illustrative example, a voltage range supplied by a seven cell battery pack may substantially match a corresponding input voltage range required by conventional communication equipment. In some implementations, the substantial match in voltage range may substantially reduce or eliminate a need for dc-to-dc conversion to match the battery pack output to the equipment input voltage range. In such implementations, energy losses may be substantially avoided by elimination of losses in dc-to-dc conversion equipment. Further savings may be realized by reduced cooling requirements, reduced equipment volume (e.g., higher energy density), and reduced manufactured cost and parts count, which may in turn yield improved mean time between failure, for example.

In one exemplary aspect, an intelligent battery pack module may include electrochemical cells having a positive terminal and a negative terminal. The intelligent battery pack module may further a include battery pack interface module for mounting onto the cell assembly. The battery pack interface module has a cover and a base that cooperate to form a housing. The underside of the base includes connection bosses for aligning with each of the terminals of the electrochemical cells. A battery circuitry is disposed within the housing. The battery circuitry includes connectors for electrically connecting the electrochemical cells, at least some of the connectors connecting an electrochemical cell of one polarity with an adjacent electrochemical cell of opposite polarity. The intelligent battery pack module further includes a handle attached to the battery pack interface module.

In various embodiments, the handle may be self-retracting. The electrochemical cells may be rechargeable lithium ion cells, or include LiFePO4. The battery circuitry may include discrete components individually attached to the inside of the housing on the base. The battery circuitry may include a printed circuit board, which may include, the connectors soldered to wire traces photolithographed onto a laminated substrate. The handle may be in a fixed position or be formed of metal. The handle may include a tubular handgrip and an elastic cord that extends through the tubular handgrip.

In another exemplary aspect, an intelligent battery pack module may include a cell assembly that includes a plurality of electrochemical cells, each of the electrochemical cells having a positive terminal and a negative terminal, and a battery pack interface module for mounting onto the cell assembly. The battery pack interface module may have a cover and a base that cooperate to form a housing. The underside of the base may include connection bosses for aligning with each of the terminals of the electrochemical cells. Battery circuitry disposed within the housing may include a laminated substrate for electrically connecting the electrochemical cells. The laminated substrate may include conductors that connect an electrochemical cell of one polarity with an adjacent electrochemical cell of opposite polarity and a connector for connecting with an external device. A battery pack monitor module may be configured for releasable coupling with the connector of the laminated substrate for managing the operation and function of the cell assembly.

The battery pack monitor module may include sensors. The cover may include a battery pack monitor module port for connection of the battery pack monitor module with the connector of the laminated substrate and a power port. The battery pack monitor module port and the power port may be located on the edges that form the cover. The cover may include a raised portion, and the battery pack monitor module port and the power port are located on an edge that forms the raised portion.

In another exemplary aspect, a method of making an intelligent battery pack module may include providing a cell assembly comprising a plurality of electrochemical cells, each of the electrochemical cells having a positive terminal and a negative terminal. The method may also include mounting a battery pack interface module onto the cell assembly. The battery pack interface module has a cover and a base that cooperate to form a housing. The method further includes providing on the underside of the base connection bosses for aligning with each of the terminals of the electrochemical cells, and a battery circuitry disposed within the housing. The battery circuitry may include connectors for electrically connecting the electrochemical cells. Each of the connectors connects an electrochemical cell of one polarity with an adjacent electrochemical cell of opposite polarity. The method further includes mounting the battery pack interface module onto the cell assembly based on aligning the connection bosses with the terminals of the electrochemical cells, and positioning the connectors on the base within the housing based on aligning one end of each connector with a terminal of a electrochemical cell of one polarity and aligning the other end of the connector with a terminal of an adjacent electrochemical cell of opposite polarity. The method includes attaching a handle to the battery pack interface module.

Apparatus and associated methods may involve packaging a plurality of rechargeable lithium ion cells into an intelligent battery pack module. A battery pack interface module may be adapted for cooperating with a battery cell assembly of rechargeable lithium ion battery cells for efficiently and conveniently managing the operation of the battery cells. The battery pack interface module may include a cover and a base that cooperate to form a housing for containing circuitry that electrically interconnects the battery cells. The circuitry may be discrete components or a printed circuit board (PCB) attached to the inside of the base and vertically aligned with the battery cells. The circuit board may include a header for attaching with a battery pack monitor module that incorporates the sensors that might otherwise be discrete components positioned on the base or circuit board. The sensors may include voltage, current, temperature, or load balancing sensors. Handles may be attached to the battery pack interface module to facilitate movement of the intelligent battery pack module. The ports on the cover for connection with a power source or battery pack monitory module and the handles may be strategically positioned to provide easy access to the ports and stacking of the intelligent battery pack module.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of this disclosure.

What is claimed is:

1. An intelligent battery pack module, the module comprising:
    a battery pack interface module mountable onto a cell assembly having a footprint, the cell assembly comprising a plurality of electrochemical cells each having a positive terminal and a negative terminal, the battery pack interface module having a cover and a base that cooperate to form a housing, wherein an underside of the base includes an alignment structure that aligns with the terminals of the electrochemical cells, and when mounted onto the cell assembly the battery pack interface module is positioned entirely within the footprint of the cell assembly;
    battery circuitry disposed at least partially within the housing, the battery circuitry having terminal connectors which establish physical and electrical connections with the terminals of the electrochemical cells, the physical connections between the terminal connectors and the terminals maintain the battery pack interface module mounted onto the cell assembly; and
    a first handle attached to the battery pack interface module.
2. The module of claim 1, wherein the alignment structure comprises connection bosses.

3. The module of claim 1, wherein the alignment structure comprises apertures.

4. The module of claim 1, wherein the battery circuitry comprises discrete components such that each of the terminal connectors are individually attached to the base.

5. The module of claim 4, wherein each of the terminal connectors are attached and are located inside the housing.

6. The module of claim 1, wherein the battery circuitry comprises a printed circuit board.

7. The module of claim 1, further comprising: one or more data interface ports in communicative connectivity with the battery circuitry.

8. The module of claim 7, wherein the one or more data interface ports extend from the cover.

9. The module of claim 7, further comprising: a battery pack monitor module releasably coupleable with the one or more data interface ports, the battery pack monitor module which manages operation and function of the cell assembly through the battery circuitry.

10. The module of claim 1, wherein the first handle is self-retracting relative the battery pack interface module.

11. The module of claim 1, wherein the first handle is fixed relative the battery pack interface module.

12. The module of claim 1, further comprising: a second handle extending from an opposite end of the battery pack interface module as the first handle.

13. The module of claim 12, wherein the second handle comprises a tubular handgrip and an elastic cord that extends through the tubular handgrip.

\* \* \* \* \*